Dec. 16, 1969 J. F. BRUDER 3,484,765

PLATED-WIRE MEMORY STACK CONFIGURATION

Filed June 19, 1967 2 Sheets-Sheet 1

INVENTOR
JOHN F. BRUDER
BY Thomas J. Nikolai
ATTORNEY

INVENTOR
JOHN F. BRUDER
BY Thomas J Nikolai
ATTORNEY

United States Patent Office 3,484,765
Patented Dec. 16, 1969

3,484,765
PLATED-WIRE MEMORY STACK CONFIGURATION

John F. Bruder, Minneapolis, Minn., assignor to Sperry Rand Corporation, New York, N.Y., a corporation of Delaware Filed June 19, 1967, Ser. No. 647,017
Int. Cl. G11b *5/00*
U.S. Cl. 340—174 6 Claims

ABSTRACT OF THE DISCLOSURE

A plated-wire memory stack configuration of a plurality of aligned plated-wire digit-line pairs. Each of the digit line pairs is coupled to a differential amplifier whereby the nonselected digit line functions as the dummy line for the selected digit line of the digit line pair.

BACKGROUND OF THE INVENTION

The present invention relates to the electronic data processing field and particularly to an electrically alterable memory system using electrical conductors plated with a thin-ferromagnetic-film layer as the memory elements. Such memory systems are well known with their principle advantage lying in their adaptability to mass, or batch, fabrication techniques that provide high volumetric efficiency, i.e., many binary digits, or bits, per cubic inch, and the resulting economy. An excellent background for such memory systems appears in the publication "A Low Power Plated Wire Memory System," Sperry Engineering Review, Fall 1965, G. A. Fedde Pages 19–22.

Such plated-wire memory systems utilizing the magnetization of discrete areas along a conductive wire plated by a thin-ferromagnetic-film layer may be operated in the well known word-organized or bit-organized memory systems. The high volumetric efficiency achieved by such memory systems must necessarily bring the several areas of magnetization, each representing discrete bits of digital data, and their associated circuitry into closer proximity whereby there arises "noise" signals that are similar to those obtained in more conventional toroidal, ferrite core arrays. With the plated-wire digit lines, which are normally established in a parallel, coplanar array, enveloped by a plurality of word lines orthogonal thereto there is provided the normal capacitive and inductive coupling between adjacent digit lines and word lines whereby memory selection currents may induce noise signals in the selected digit lines that are of such a magnitude as to substantially block out the digital significance of the readout signal. Accordingly, several prior art techniques for the elimination of such deleterious noise signals have been incorporated in plated-wire memory systems.

One prior art technique often utilized to eliminate, or reduce, such deleterious noise signals is the utilization of a "dummy" wire, or line. In toroidal ferrite core arrays such dummy lines generally consist of a conductor running parallel to and associated with a particular output, or sense line, such that the dummy line and the output line are effected by substantially the same noise signals whereby there is induced in such lines similar common-mode noise signals. The dummy line and the output line are in turn coupled to a differential sense amplifier, which cancels out the common-mode noise signal leaving only the desired readout signal as an output therefrom. In plated-wire memory systems the dummy line usually consists of a digit line, similar to that of the other plated wires of the plated-wire array, which is coupled in parallel to suitable gating means with a plurality of digit lines. The dummy line and the associated plurality of digit lines are maintained in a substantially close-packed relationship whereby it is expected that the common-mode, or noise, signals, that are induced in the dummy line are equal to those that are induced in each of the associated digit lines whereby the associated differential amplifier provides a signal substantially representative of the expected readout signal.

As the noise, or common-mode, signals are generally due to radiated coupling, denoted as capacitive and inductive coupling, large loop areas established by substantially widely-separated dummy lines-digit line pairs can contribute undesirably large noise signals of different intensities whereby the differential sense amplifier is unable to eliminate all the deleterious noise. It would be desirable if each digit line had its own associated dummy line whereby the physical relationship therebetween would be constant throughout the entire two-dimensional plated-wire memory array. However, it is obvious that this expedient would halve the volumetric efficiency, and, accordingly, double the cost per bit of such a memory system. It is therefore desirable that an improved arrangement be provided whereby each digit line would have an associated dummy line without adversely effecting the volumetric efficiency of the memory system.

SUMMARY OF THE INVENTION

The present invention is directed toward a configuration of a two-dimensional array of plated-wire memory elements in which the plated-wire digit lines are arranged in two planar arrays with associated digit lines of each array parallel to and superposed the other. The word lines are composed of three portions; a top portion, a middle portion, and a bottom portion, all three portions electrically interconnected at one end providing three open ends at the opposite ends therof. The superposed and associated digit lines are coupled across an associated differential amplifier for the cancellation of the common-mode noise signals induced in the associated digit line. The selection of one of the pair of associated digit lines by the selective energization of the associated word-line-portions induces substantially similar common-mode noise signals in the selected and unselected digit lines of the pair of digit lines whereby the associated differential sense amplifier is enabled to eliminate the common-mode noise signal, and produce, as an output thereof, an output signal representative of the readout data. Accordingly, it is a primary object of the present invention to provide an improved plated-wire memory system eliminating the need for dummy lines while yet providing an improved signal-to-noise ratio not obtainable in prior art memory systems.

DESCRIPTION OF THE PREFERRED EMBODIMENT

Figure 1:
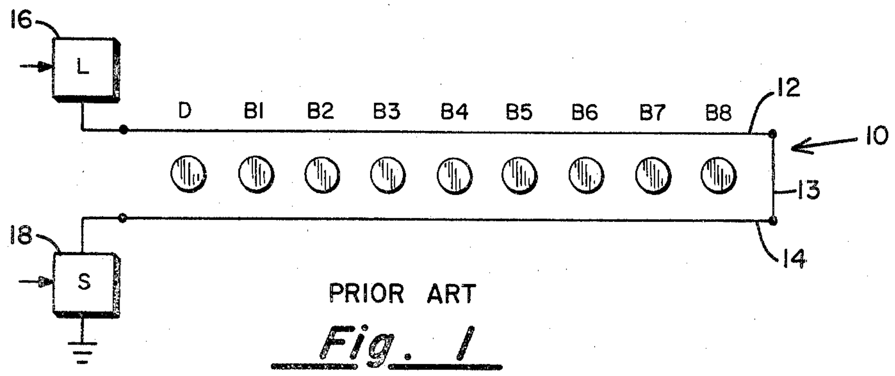
PRIOR ART Fig. 1
FIG. 1 is a diagrammatic illustration of a cross section of a prior art plated-wire memory array.

With particular reference to FIG. 1 there is presented a diagrammatic illustration of a cross section of a prior art plated-wire memory array incorporating a dummy line D and an associated group of eight digit lines B1–B8. This prior art array includes a word line 10 comprising top and bottom portions 12 and 14 intercoupled at their closed end by a conductive member 13. The fabrication of such plated-wire array may be any well known means including that of L. J. Michaud et al., Ser. No. 644,861, filed June 9, 1967. The selection of the digit line 10, formed by wires 12, 13, 14, is usually accomplished by a double-ended selection technique such as current driver 16 and diverter switch 18. Such selection systems may be of any of the well known methods including that of G. R. Lane, Ser. No. 645,004, filed June 9, 1967.

Figure 2:
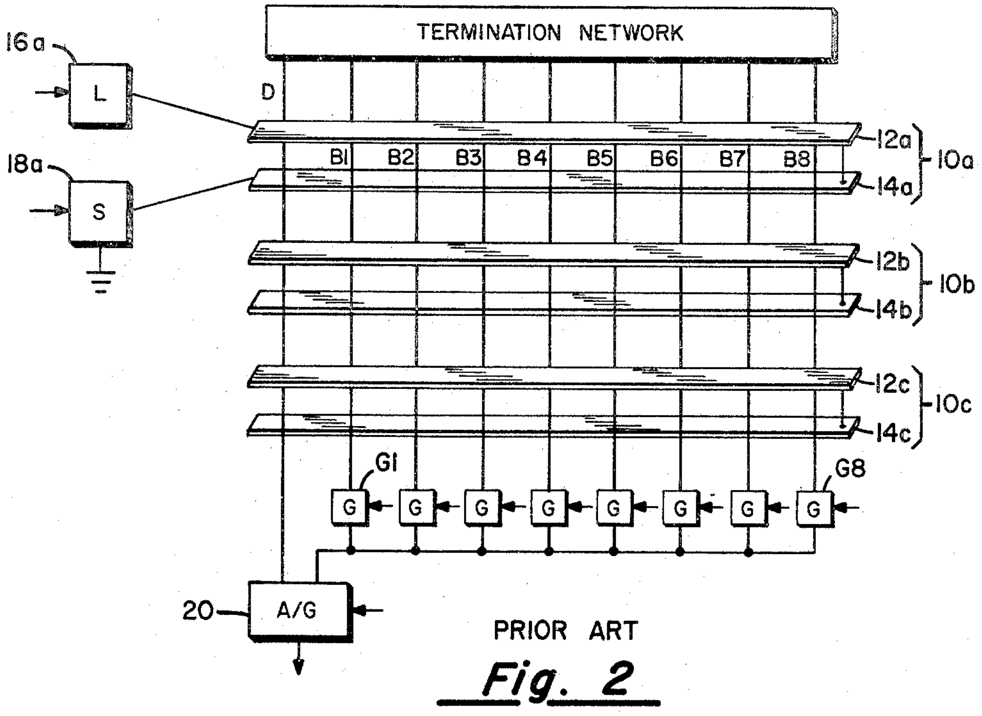
PRIOR ART Fig. 2
FIG. 2 is a schematic illustration of the circuitry associated with the array of FIG. 1.

With particular reference to FIG. 2 there is presented a schematic illustration of the circuitry associated with the prior art array of FIG. 1. In this prior art arrangement there are provided a single dummy line D and an associated group of a plurality of eight digit lines B1–B8 whereby dummy line D functions as a dummy line for each of the associated digit lines B1–B8 of the associated group. In this arrangement, to select a particular digit line and thus couple it to the associated amplifier/gate there are provided a plurality of gates G1–G8, one gate associated with a particular digit line i.e., gate G1 is associated with digit line B1. In this operation, as for example, for the readout of information associated with digit line B1, gate G1 and amplifier/gate 20 are concurrently enabled (when driver **16*a* and diverter 18*a* are also concurrently enabled to affect the associated discrete magnetizable areas, or bits, of digit lines B1–B8) coupling dummy line D and digit line B1 to amplifier/gate 20 whereby the associated readout information is emitted therefrom. In this arrangement, where each bit of a multi-bit word is readout on one of the digit lines B1–B8 at a time it is apparent that only one gate G1–G8 may be enabled at a time. Thus, for the readout of a multi-bit word of M bits there would be required M groups each of digit lines B1–B8** and an associated dummy line D.

Figure 3:
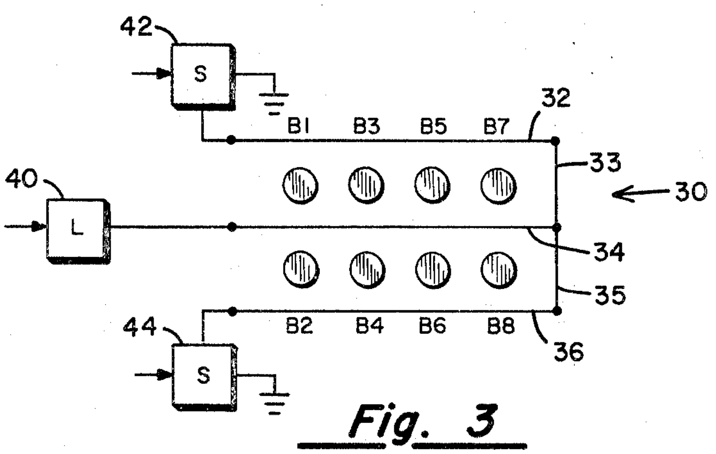
FIG. 3 is a diagrammatic illustration of a cross section of a plate-wire memory array incorporating the present invention.

With particular reference to FIG. 3 there is presented a diagrammatic illustration of a cross section of a plated-wire memory array incorporating the present invention. In this arrangement there are provided two groups of parallel-arranged planar plated-wire digit lines; a first array formed by digit lines B1, B3, B5 and B7, and the second array formed by digit lines B2, B4, B6 and B8. These two arrays are arranged in a stacked arrangement having corresponding digit lines in superposed, parallel alignment forming four pairs of associated digit lines; a first pair formed by digit line B1 and B2, a second pair formed by digit lines B3 and B4, a third pair formed by digit lines B5 and B6, and a fourth pair formed by digit lines B7 and B8. The word lines 30 that are associated with this configuration are comprised of a top portion 32 a middle portion 34 and a bottom portion 36 intercoupled at their right-hand ends for forming a closed end by conductive segments 33 and 35.

Selection of the digit lines of each group is as discussed as with respect to the prior art embodiment of FIG. 1. As an example, for the selection, or affecting of the associated magnetizable areas of digit lines B1, B3, B5, B7 of the first group, word driver 40 and diverter 42 are concurrently enabled causing a selection current signal to be coupled to the open end of line 34 through conductive portion 33 along line 32 and out the open end thereof to diverter 42 and thence to ground. In a like manner the digital information associated with digit lines B2, B4, B6, B8 of the second group would be read out by the concurrent enabling of word driver 40 and diverter 44 causing a selection current signal to be coupled to the open end of line 34 through conductive portion 35 along line 36 and out its open end thereof thence to ground through diverter 44. As discussed with particular reference to FIG. 1 the fabrication and selection of the memory elements of FIG. 3 may be in accordance with the L. J. Michaud et al. and G. R. Lane patent applications.

Figure 4:
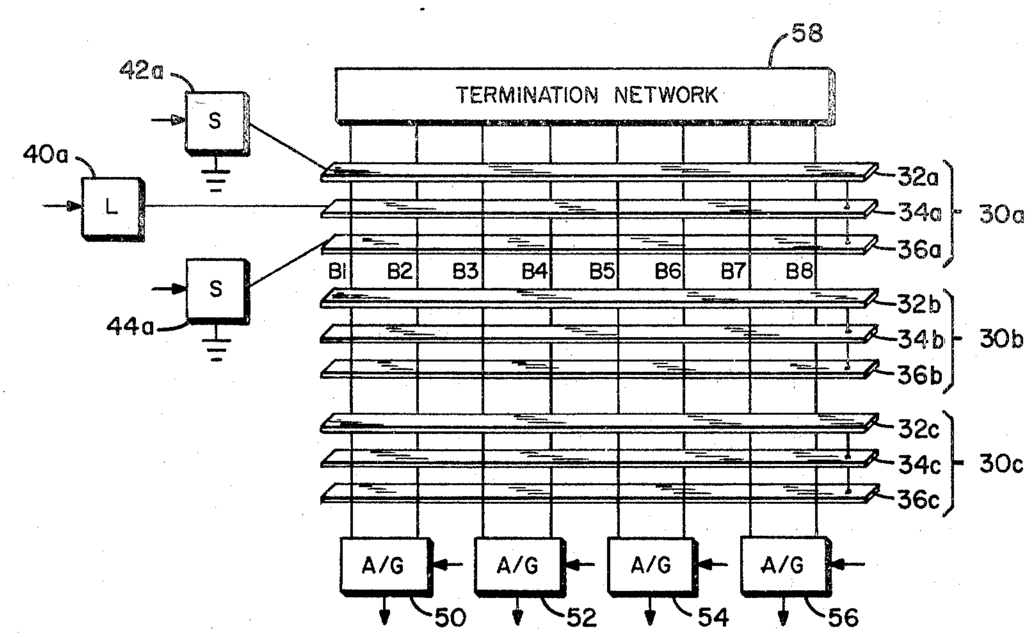
FIG. 4 is a schematic illustration of the circuitry associated with the array of FIG. 3.

With particular reference to FIG. 4 there is presented a schematic illustration of the circuitry associated with the embodiment of FIG. 3. The embodiment of FIG. 4 illustrates a plated-wire memory array of eight digit lines B1–B8 and nine associated word lines **30*a*–30*c*. Digit lines B1–B8 are formed into four pairs of digit lines wherein digit lines B1, B2 form a first pair, digit lines B3, B4 form a second pair, digit lines B5, B6 form a third pair, and digit lines B7, B8 form a fourth pair as discussed above with particular reference to FIG. 3. Each digit line pair terminates at an associated amplifier/gate at a first end and at a termination network on the second end; the first, second, third and fourth pairs of digit lines terminate at amplifier/gates 50, 52, 54, and 56, respectively, at the first end and at termination network 58 at the second and opposite end. It is to be appreciated that the circuit schematic of FIG. 4 is illustrative only, it being understood that a digit line, such as word line 30*a*, is composed of the similarly referenced superposed top, middle, and bottom portions and the interconnecting elements thereof as illustrated with particular reference to word line 30 in FIG. 3. This arrangement provides an array of six words each of four bits in length. As an example, top and bottom portions 32*a*, 34*a* of word line 30*a* are coupled to digit lines B1, B3, B5, and B7 forming a four-bit word therewith while middle and bottom portions 34*a* and 36*a* of word line 30*a* are coupled to digit lines B2, B4, B6, and B8** forming a four-bit (multi-bit) word therewith.

Selection of any four-bit word of the six word array of FIG. 4 is as discussed above with particular reference to FIG. 3. As an example, the concurrent enabling of word driver **40*a* and diverter 42*a* couples a drive current signal to the open end of line 34*a* and back through line 32*a*, emitted at its open end and then being coupled to diverter 42*a* and thence to ground. This current signal, for the readout operation, would effect the discrete areas of magnetization that are associated with digit lines B1, B3, B5 and B7, they being intermediate lines 32*a* and 34*a* causing a respectively associated signal to be coupled to the associated amplifier gates 50, 52, 54 and 56, respectively. The respective digit line pairs e.g., B1, B2, would be effected by like common-mode noise signals, which common-mode noise signals would be coupled to the associated amplifier gate e.g., amplifier/gate 50, causing substantial cancellation thereat causing the associated amplifier/gate e.g. amplifier gate 50 to emit a signal that is representative of the informational state of the area of magnetization that is affected by the readout digit line, e.g., digit line B1, of the effected pair of digit lines, e.g., B1, B2**.

As schematically illustrated in the diagrammatic illustration of FIG. 3 the lines forming a digit line pair are close enough to each other so that the common-mode noise coupling between each of the digit lines of the pair and the word lines is substantially the same. This arrangement provides a substantially smaller loop area compared to that of the embodiment of FIG. 1. As an example, the loop formed by digit lines B1, B2 of the first pair of FIG. 3 is substantially shorter than the loop area formed by dummy line D and digit line B8 of the embodiment of FIG. 1. As the intensity of the common-mode noise signal is substantially a function of the loop area of the two affected lines it can be seen that the inventive concept of the present invention provides a substantial improvement in signal-to-noise ratio over that of the illustrated prior art.

It is apparent then that there has been disclosed and described herein an improved plated-wire memory stack configuration providing an improved signal-to-noise ratio for eliminating the prior art necessity of the use of a dummy line and additional digit line gates. It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

I claim:

1. A plated-wire memory system, comprising:

a plurality B of digit lines, each comprising a plated-wire memory element;

a plurality N of word lines, each word line comprising a top portion, a middle portion, and a bottom portion, said portions having intercoupled closed ends at one end for forming respectively associated open ends opposite said closed ends;

said memory elements formed in two groups, the memory elements of each group arranged in an array with a first group enveloped by the top and middle portions of said word lines and with the second group enveloped by the middle and bottom portions of said word lines;

said first and second groups forming $B/2$ pairs of memory elements, a separate memory element of each pair from each of said groups;

a plurality of amplifiers, a separate one coupled to a separate pair of memory elements;

drive means for selectively coupling a current drive signal to the open end of the middle portion of a selected one of said word lines;

diverter means for selectively concurrently grounding the open end of either the top or the bottom portions of said one selected word line;

a dummy line formed by the memory element enveloped by the selected middle portion and the nonselected top or bottom portion of the selected one of said N word lines.

2. The memory system of claim 1 wherein the memory elements of each group are parallel-arranged in a planar array.

3. The memory system of claim 2 wherein the two memory elements of each pair are in a parallel, superposed arrangement.

4. The memory system of claim 3 wherein the portions of each of said word lines are in a parallel, superposed arrangement and are oriented orthogonal to said digit lines.

5. The memory system of claim 4 wherein said N digit lines form 2N multi-bit words each of $B/2$ bits in length.

6. The method of operating a plated-wire memory system comprising B plated-wire memory elements arranged in first and second arrays, each array including $B/2$ memory elements, to which are coupled a plurality of word lines, each word line comprising parallel, superposed top, middle and bottom portions that are intercoupled at first closed ends forming respectively associated opposite second open ends wherein the memory elements of the first array are enveloped by the top and middle portions of the word lines and the memory elements of the second array are enveloped by the middle and bottom portions of the word lines, the method comprising:

selectively causing a current drive signal to flow through the middle portion and either the top or the bottom portion of a selected one of said word lines;

utilizing the memory elements enveloped by the selected middle portion and the nonselected top or bottom portion of the one selected word line as dummy lines; and reading the information from the memory elements enveloped by the selected middle portion and the selected top or bottom portion of the one selected word line.

References Cited

UNITED STATES PATENTS

| | | | |
|---|---|---|---|
| 3,209,333 | 9/1965 | Russell | 340—174 |
| 3,371,326 | 2/1968 | Fedde | 340—174 |
| 3,402,401 | 9/1968 | Taren | 340—174 |

BERNARD KONICK, Primary Examiner

KENNETH E. KROSIN, Assistant Examiner